Patented Aug. 24, 1948

2,447,998

UNITED STATES PATENT OFFICE 2,447,998

PREPARATION OF SUBSTITUTED ACYLANILIDES

Richard C. Clapp and John Krapcho, Stamford, Conn., assignors to American Cyanamid Company, New York, N. Y., a corporation of Maine No Drawing. Application September 18, 1945, Serial No. 617,180

4 Claims. (Cl. 260—518)

The present invention relates to compounds and a new method of preparing the same. More particularly, it relates to acylanilides substituted in the para position with keto acids and a method of preparing them.

The process of the present invention comprises the steps of mixing together an acylanilide, a polycarboxylic acid anhydride, carbon disulphide, and a Friedel-Crafts catalyst at a temperature below about 50° C. The reaction may be illustrated by the following equation:

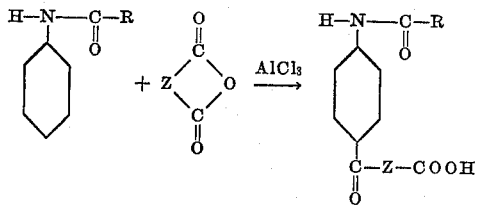

in which R is an alkyl radical and Z is an arylene radical or an alkylene radical such as $(CH_2)_n$ wherein $n$ is a small whole number of from 2 to 6.

The reaction mixture is maintained at a temperature of from about 0° C. to about 50° C. for from about 36 hours to about 48 hours. While the initial reaction is complete in a matter of one-half to about three hours, we have found that in order to obtain the best yields of product the reaction mixture should stand from one and a half to two days.

We can use, as one of the intermediates, an hydride of polycarboxylic acids such as succinic acid, glutaric acid, adipic acid, pimelic acid, suberic acid, phthalic acid, hexahydrophthalic acid, naphthalene-1,2-dicarboxylic acid, anthraquinone-1,2-dicarboxylic acid, anthracene-1,9-dicarboxylic acid, naphthalene-2,3-dicarboxylic acid, and the like.

For most purposes acetanilide is the preferred acylanilide although we can use other acylanilides such as propionalide, butyranilide, and other aliphatic acylanilides having up to about 20 carbon atoms in the aliphatic chain.

Conventional Friedel-Crafts catalysts such as aluminum chloride, ferric chloride, stannous chloride, etc. may be used in the process.

The products can be purified by dissolving in alkaline solution, treating with norite and precipitating with acid. Further purification can be obtained by crystallizing the product from methanol, ethanol, propanol, acetic acid, and the like.

Most of the compounds of the present invention are useful as intermediates in the preparation of compounds, having bacteriostatic properties, such as those described and claimed in our copending application Serial No. 546,205 filed July 22, 1944, now Patent #2,418,925 issued April 15, 1947.

Our invention will now be illustrated in greater detail by means of the following specific example showing the reaction of acetanilide with a representative polycarboxylic acid anhydride (succinic anhydride). It will be understood, of course, that the example is given for purposes of illustration and is not to be considered as limiting our invention to the particular details described therein.

Example

A suspension of 185 g. (1.39 mols) of aluminum chloride in 200 cc. of carbon disulfide (previously shaken with mercury) was prepared by grinding the granular product with the solvent in a mortar. The suspension was placed in a flask fitted with a Hershberg stirrer and a condenser and immersed in an ice bath. Fifty grams (0.37 mol) of acetanilide and 37 g. (0.37 mol) of succinic anhydride were ground together and the mixture was added rapidly to the aluminum chloride suspension with stirring. After the initial reaction had subsided, the cooling bath was removed and stirring was continued until the stiffness of the dark red mixture halted the stirrer (about two hours). After standing for two days at room temperature the mixture was decomposed with ice. The product was filtered off and washed well with water. The solid was dissolved in aqueous sodium bicarbonate and the solution was filtered. Acidification of the filtrate precipitated a yellow powder. The product obtained was beta-(4-acetylaminobenzoyl)-propionic acid (yield 60% of theoretical) which after two crystallizations from alcohol had a melting point of 202°–205° C.

We claim:

1. A method of preparing compounds having the formula

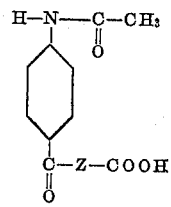

in which Z is a $(CH_2)_n$ radical where $n$ is a small whole number from 2 to 6 which comprises mixing acetanilide with a compound having the formula

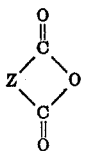

in which Z is as defined above, in the presence of a Friedel-Crafts catalyst and carbon disulfide.

2. A method of preparing beta-(4-acetylaminobenzoyl)-propionic acid which comprises mixing acetanilide and succinic anhydride at a temperature of from 0° to 50° C. for from about 36 hours to 48 hours in the presence of aluminum chloride and carbon disulfide.

3. A method of preparing compounds having the formula

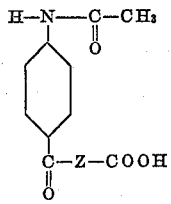

in which Z is a $(CH_2)_n$ radical where $n$ is a small whole number from 2 to 6 which comprises mixing acetanilide with a compound having the formula

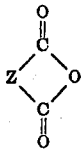

in which Z is as defined above, at a temperature of from 0° to 50° C. for from about 36 hours to 48 hours in the presence of a Friedel-Crafts catalyst and carbon disulfide.

4. A method of preparing gamma-(4-acetylaminobenzoyl)-butyric acid which comprises mixing acetanilide and glutaric anhydride at a temperature of from 0° to 50° C. for from about 36 hours to 48 hours in the presence of aluminum chloride and carbon disulfide.

RICHARD C. CLAPP.
JOHN KRAPCHO.

REFERENCES CITED

The following references are of record in the file of this patent:

UNITED STATES PATENTS

| Number | Name | Date |
|---|---|---|
| 1,654,290 | Gubelmann | Dec. 27, 1927 |
| 1,786,526 | Groggins | Dec. 30, 1930 |
| 2,071,496 | Bruson et al. | Feb. 23, 1937 |
| 2,320,217 | Bruson | May 25, 1943 |
| 2,394,230 | Billman | Feb. 5, 1946 |

OTHER REFERENCES

Aloy et al.: Bull. Soc. Chim. de France (4), vol. 9, page 762 (1911). Copy in Scientific Library.

Kohler et al.: Beilstein Handbuch der Org. Chem., 4th ed., vol. 10, suppl., page 331 (1932). Copy in Div. 6.